(12) United States Patent
Holmberg et al.

(10) Patent No.: US 7,970,086 B2
(45) Date of Patent: Jun. 28, 2011

(54) SYSTEM AND METHOD FOR CLOCK DRIFT COMPENSATION

(75) Inventors: Johnny Holmberg, Hallstahammar (SE); Mikael Hjelm, Västerås (SE)

(73) Assignee: Infineon Technologies AG, Munich (DE)

( * ) Notice: Subject to any disclaimer, the term of this patent is extended or adjusted under 35 U.S.C. 154(b) by 979 days.

(21) Appl. No.: 11/839,402

(22) Filed: Aug. 15, 2007

(65) Prior Publication Data
US 2009/0046822 A1 Feb. 19, 2009

(51) Int. Cl.
*H04L 7/00* (2006.01)
(52) U.S. Cl. .................................. 375/354; 327/393
(58) Field of Classification Search .............. 375/354, 375/355, 359; 714/818; 327/153, 392, 393
See application file for complete search history.

(56) References Cited

U.S. PATENT DOCUMENTS

| | | | | |
|---|---|---|---|---|
| 5,742,798 A * | 4/1998 | Goldrian | | 713/400 |
| 5,959,563 A * | 9/1999 | Ring | | 341/155 |
| 6,775,345 B1 * | 8/2004 | Song | | 375/376 |
| 7,254,598 B2 * | 8/2007 | Yomo et al. | | 708/319 |
| 7,519,489 B2 * | 4/2009 | Tietz et al. | | 702/69 |
| 2007/0276892 A1 * | 11/2007 | Yomo et al. | | 708/301 |
| 2010/0014371 A1 * | 1/2010 | Schoenfeld et al. | | 365/222 |

OTHER PUBLICATIONS

Linden, J., "Achieving the Highest Voice of VoIP Solutions," Preceeding of 2004 GSPx "International Embedded Solutions Event," 6 pages, Santa Clara, Ca.
Jiang, W. et al., "Qua;ity and Performance Evaluation of VoIP End Points," Preceeding of Nyman-Workshop, 2002, 6 pages.
"IMSC improves Internet video & audio streaming," IMSC News, University of Southern California, Jul. 2004, p. 4.
Werner, S., "An Algorithm for Audio Skew Compensation in Low Latency Environments," Proceedings of the ICMC 2005 International Conference on Computer Music, 2005, San Francisco, CA., 3 pages.

* cited by examiner

*Primary Examiner* — Jean B Corrielus
(74) *Attorney, Agent, or Firm* — Slater & Matsil, L.L.P.

(57) ABSTRACT

A method for processing a signal includes monitoring an over-sampled signal to detect deviations in a number of fill samples, and providing an electronic delay adjustment to a signal path. If a deviation in the number of fill samples is detected, the electronic delay adjustment from the signal path is removed in one or more steps until all of the electronic delay adjustment is removed from the signal path.

27 Claims, 3 Drawing Sheets

SYSTEM AND METHOD FOR CLOCK DRIFT COMPENSATION

TECHNICAL FIELD

The present invention relates generally to a system and method of compensating for clock drift in a system and, more particularly, to a system and method of correcting for signal samples that arrive earlier or later than expected as a result of clock drift.

BACKGROUND

Electronic systems, such as communication systems may include multiple clocks that are used, for example, to sample signals for processing during signal transmission and reception. Often the clocks are not synchronized, which may result in sampling errors, such as too many or too few samples in the received signal. For example, in an interface to an ISDN line having an external clock, or in a PCM interface toward a telephone system that extracts samples at its own rate, different clock domains may interact, and these clock domains may not be synchronized.

To correct for these sampling errors, a new sample may be inserted into the signal to compensate for a sample that arrives late, or a sample may be deleted from the signal to compensate for samples that arrive too early. For example, samples may be input to a first-in-first-out buffer (FIFO). If the FIFO is almost full, a sample may be removed. If the FIFO is almost empty, a sample may be inserted. A disadvantage of these corrections is that an audible distortion or noise may be created by adding or removing the samples to or from a speech signal.

SUMMARY OF THE INVENTION

These and other problems are generally solved or circumvented, and technical advantages are generally achieved, by preferred embodiments of the present invention in which a system for processing a signal monitors an over-sampled signal to detect missing fill samples. When missing fill samples are detected, a plurality of delay elements are added to a signal path. The plurality of delay elements are then individually removed one at a time from the signal path at regular intervals until all of the delay elements are removed from the signal path. The system also monitors the over-sampled signal to detect extra fill samples. If extra fill samples are detected, a plurality of delay elements are removed from the signal path. The plurality of delay elements are then individually one at a time added to the signal path at regular intervals until all of the delay elements are in the signal path.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Embodiments of the present invention provides many applicable inventive concepts that can be embodied in a wide variety of specific contexts. The specific embodiments discussed are merely illustrative of specific ways to make and use the invention, and do not limit the scope of the invention.

Embodiments of the present invention may be used to remove clock drift components in signals traversing systems having several clock sources. The clocks operate independently and drift is inevitable in such systems. Each time a sample error occurs in an audio signal, such as a voice signal, for example, the sample error may be noticeable to the receiver. The sample error will give a "clicking" sound or other audible distortion anomaly when the signal is played thorough a speaker to the user. For example, in a system having a clock offset of 250 ppm at 26 MHz, a sample may be missing or redundant every 4000th sample at a 8 KHz sample rate. These missing or redundant samples will cause audible errors when the signal is played by a receiver.

Figure 1:
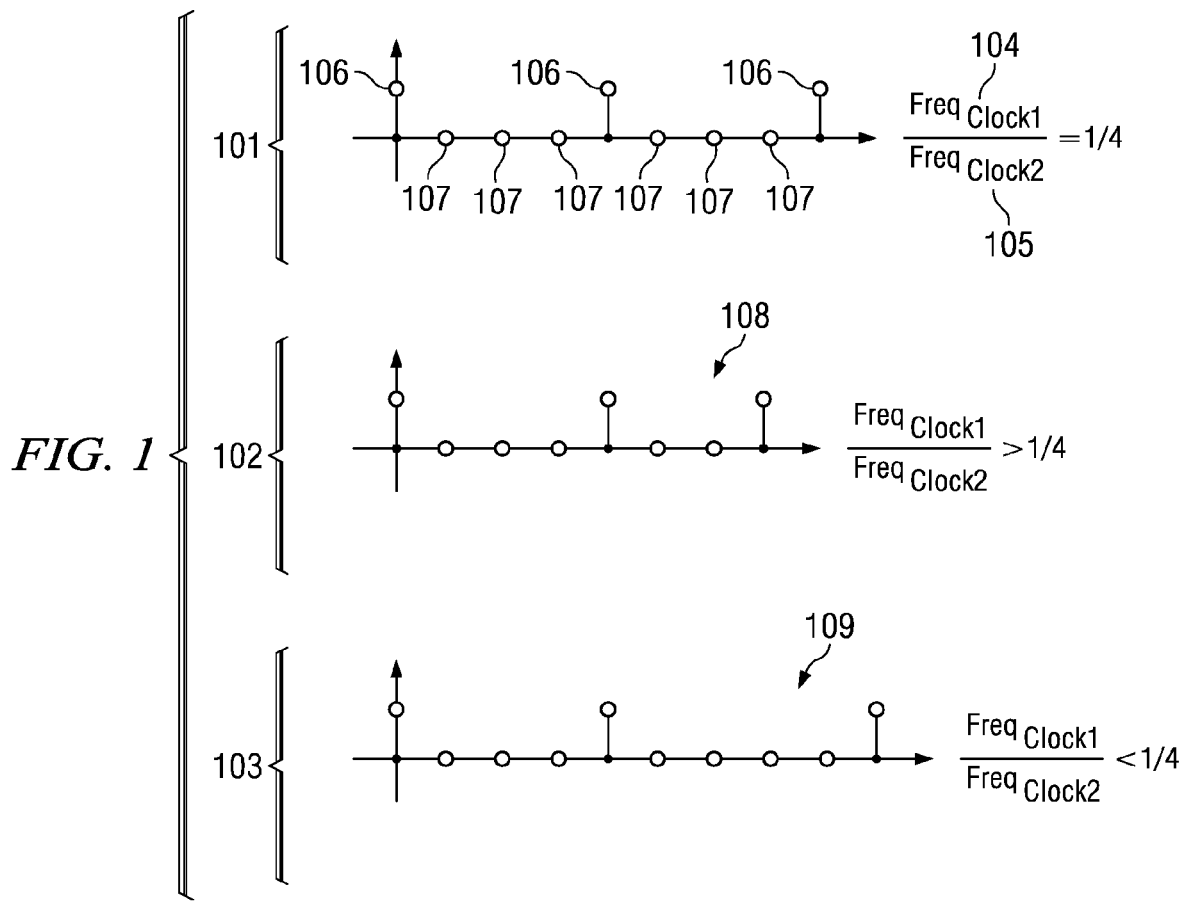
FIG. 1 illustrates sampling errors in signals processed by embodiments of the invention.

Referring to FIG. 1, exemplary receiver signal samples 101-103 are illustrated for a system using four-times over-sampling in the receiver. A transmitter associated with this example uses a clock having a frequency $Freq_{Clock2}$ 104 and a receiver uses a clock having frequency $Freq_{Clock2}$ 105. In one embodiment, the frequency $Freq_{Clock2}$ 105 may for example be four times the frequency $Freq_{Clock1}$ 104 as illustrated in signal 101. Samples 106 correspond to the signal sampled by the transmitter and fill-in or zero samples 107 are the samples that result from over-sampling the received signal. In signal 101, which illustrates the case of no clock drift, a pattern of one signal sample 106 followed by three zero samples 107 repeats in each sample period. However, if the transmit and/or receive clock frequencies drift (i.e. $Freq_{Clock2}$ not equal to an integer multiple of $Freq_{Clock1}$), then the received signal samples will not have a regular pattern such as shown in signal 101.

In signal 102, the transmit and/or receive clock frequencies have drifted and $Freq_{Clock2}$ is less than $4 \times Freq_{Clock1}$. As a result, the received signal is not sampled often enough so that eventually a sample period 108 has only two zero samples instead of three zero samples. This pattern would repeat regularly as long as $Freq_{Clock2}$ was less than $4 \times Freq_{Clock1}$. If signal 102 was played for a listener, then the missing sample in period 108 would cause an audible noise each time too few samples were present.

In signal 103, the transmit and/or receive clock frequencies have drifted and $Freq_{Clock2}$ is more than $4 \times Freq_{Clock1}$. As a result, the received signal is sampled too often so that eventually a sample period 109 has four zero samples instead of three zero samples. This pattern would repeat regularly as long as $Freq_{Clock2}$ was more than $4 \times Freq_{Clock1}$. If signal 103 was played for a listener, then the extra sample in period 109 would cause an audible noise each time too many samples were present in the signal. Periods 108 and 109, which have an extra sample or a missing sample, may occur every 4000 samples, for example, depending upon the clock drift and the sampling rate.

One method of solving the problem of missing or extra samples is either to copy the last sample or insert a zero sample when a sample is missing or to remove a sample when there are too many samples in the signal. The solution according to embodiments of the present invention is much more flexible and can be used in many systems without major modifications. Embodiments of the present invention also can be adapted to achieve certain signal-to-noise ratio (SNR) properties because it is implemented in the signal processing domain. Instead of just removing or inserting an entire sample, the present invention provides a system and method for slowly phasing in an extra sample by estimating sample points in between the actual samples and using them instead of the actual samples when adding a sample. Alternatively, the present invention slowly removes a sample when there are too many samples.

Figure 2:
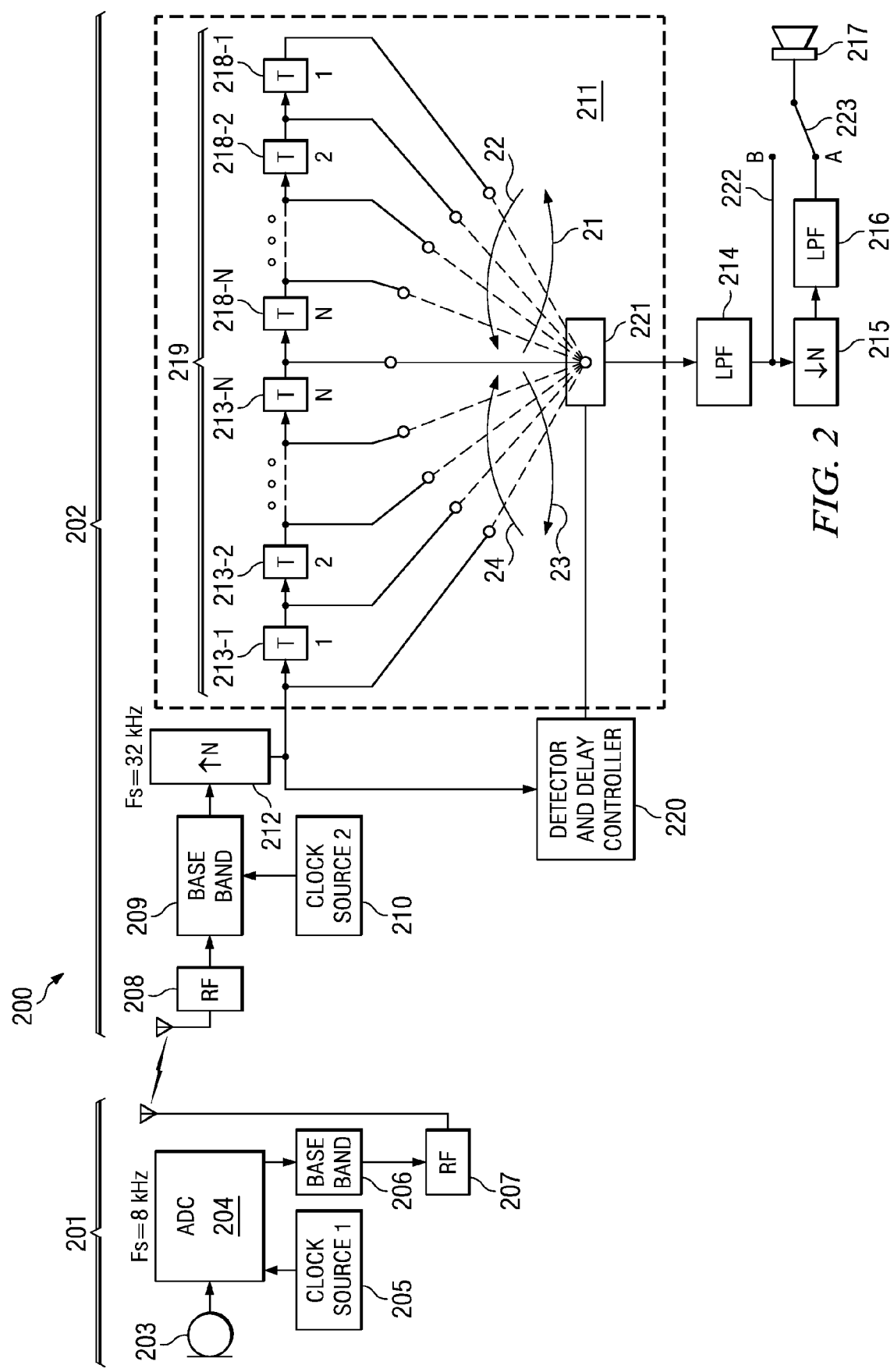
FIG. 2 is a block diagram of a system incorporating embodiments of the invention.

FIG. 2 illustrates an exemplary system incorporating one embodiment of the present invention in which transmitter 201 transmits signals to receiver 202. Transmitter 201 receives signals, such as a speech signal, via microphone 203. The output of microphone 203 is coupled to analog-to-digital converter (ADC) 204. Clock source 205 drives ADC 204, which samples the speech signal at 8 kHz to create a digitized speech signal output. The output of ACD 204 is coupled to baseband processor 206, which may, for example, modulate and encode the digitized speech signal. The output of baseband processor 206 is coupled to radio frequency (RF) processor 207, which up-converts the modulated and encoded voice signal to an RF signal and transmits the RF signal to receiver 202.

Receiver 202 receives the RF signal at RF processor 208, which down-converts the RF signal to a baseband signal. The output of RF processor 208 is coupled to baseband processor 209, which demodulates and decodes the baseband signal using clock source 210. Over-sampling circuit 212 samples the demodulated and decoded baseband signal from baseband processor 209 at a sample rate of 32 kHz, which is four-times the sampling rate of transmitter 201. The output of over-sampling circuit 212 passes through some or all of delay network 219, which is comprised of delay elements 213-1 to 213-N and 218-1 to 218-N, in clock drift compensation circuit 211. The output of delay network 219 is coupled to low pass filter (LPF) 214, and then passes through down-sampling circuit 215 and low pass filter (LPF) 216 before being played through speaker 217 to the listener. Down-sampling circuit 215 may down-sample to an 8 kHz sample rate, for example.

In the present invention, detector 220 monitors the samples output from over-sampling circuit 212 and detects when there are extra or missing samples. Detector and delay controller 220 may be a processor or state machine, for example, and may monitor the samples to detect when there are two or four zero samples instead of three in a sample period using four-times over-sampling. In other embodiments of the invention, detector and delay controller 220 may be implemented as two separate structures, applications, processors, or devices in which one device detects missing or extra samples and another device control clock drift compensation circuit 211. In a "normal" or "ideal" case, where there is no drift between transmitter clock source 205 and receiver clock source 210, the output of over-sampling circuit 212 would be similar to signal 101 (FIG. 1) and would have three zero samples 107 between each sample 106. In this normal situation, detector 220 would recognize that no signal correction is needed and the signal would be passed through delay elements 213-1 to 213-N of delay network 219 in clock drift compensation circuit 211 and then on to LPF 214.

Alternatively, when detector and delay controller 220 detects an error (i.e. missing or extra zero samples), detector 220 compensates for the error by switching clock drift compensation circuit 211 from the normal state (i.e. passing samples to LPF 214 through delay elements 213-1 to 213-N) to either a no or lower delay or to an additional delay depending on the detected error. When zero samples are missing from the signal (as illustrated in signal 102 of FIG. 1), then delay controller 220 adds additional delay to clock drift compensation circuit 211 by directing switch 221 to include additional delay units 218 to the signal path. When extra samples appear in the signal (as illustrated in signal 103 of FIG. 1), then the delay is reduced by directing switch 221 to remove delay units 213 from the signal path in clock drift compensation circuit 211.

Samples may be missing from the signal when, for example, clock source 205 ($Freq_{Clock1}$) is faster than intended relative to clock source 210 ($Freq_{Clock2}$). In this situation, more delay is added to the system by switching additional delay elements 218-1 to 218-N into the signal path of clock drift compensation circuit 211. This is illustrated in FIG. 2 by arrow 21, which represents adding delay elements 218 to the normal signal path.

After switching in additional delay elements 218-1 to 218-N, detector 220 slowly switches clock drift compensation circuit 211 back to the normal state by incrementally removing delay elements 218-1 to 218-N from the signal path using switch 221 as illustrated by arrow 22 in FIG. 2. The delay elements (218-1 to 218-N) are removed one-by-one at approximately every tenth sample until all of the delay elements 218-1 to 218-N are removed and only delay elements 213 remain in the signal path. By incrementally switching out delay elements 218 at ten-sample intervals, the changes are so small that they are not noticeable to the user and the audible distortion and/or anomalies caused by the missing samples are not heard by the user.

Extra samples may be added to the signal when, for example, clock source 205 ($Freq_{Clock1}$) is slower than intended relative to clock source 210 ($Freq_{Clock2}$). In this situation, delay is removed from the system by switching delay elements 213-1 to 213-N out of the signal path of clock drift compensation circuit 211. This is illustrated in FIG. 2 by arrow 23, which represents removing delay elements 213 from the normal signal path.

After switching out delay elements 213-1 to 213-N, detector 220 slowly switches back to the normal state by incrementally adding delay elements 213-1 to 213-N back into the signal path as illustrated by arrow 24 in FIG. 2. The delay elements (213-1 to 213-N) are added one-by-one at approximately every tenth sample until all of the delay elements 213-1 to 213-N are back in the signal path. By incrementally switching in delay elements 213 at ten-sample intervals, the changes are so small that they are not noticeable to the user and the audible distortion and/or anomalies caused by the extra samples are not heard by the user. Each delay element 213, 218 is assigned a time delay "T." Delay elements 213, 218 may be any delay element, such as a delay element constructed of D flip-flops.

It will be understood that using a ten-sample interval for adding or removing delay elements 213, 218 is just one embodiment of the invention. In other embodiments, delay elements 213, 218 may be added or removed at any other regular or irregular interval or period. In the example illustrated in FIGS. 1 and 2, the relationship between the clock sources is four; however, the present invention may be extended to other relations as well, and it will be understood that the present invention may be used to compensate for clock drift in a system using any sampling format.

Filters LPF 214 and LPF 216 preferably are implemented with a normalized cut off frequency of 1/N. Where "N" is the up- and down-sampling rate in circuits 212 and 215 and also corresponds to the number of delay elements available to be added or removed from clock drift compensation circuit 211. The signal-to-distortion ratio (SDR) of the system can be further improved by increasing the value of "N," which controls the up-sampling, down-sampling and the number of delays in the switching network. The variable N may be increased until the output received signal is acceptable to the user. As the value of N is decreased, the audible distortion will be more apparent to the user.

In another embodiment of the invention, the signal output from compensation circuit 211 may take alternative path 222 and does not need to pass down-sampling or decimation block 215 or filter 216. Switch 223 may be used to select the path used between compensation circuit 211 and output 217. In switch 223 position A, the output of compensation circuit 211 is routed through decimation block 215 and filter 216. In switch 223 position B, the output of compensation block 211 is routed past decimation block 215 and filter 216 directly to speaker 217. In other embodiments of the invention, instead of providing selectable routes for the output of compensation circuit 211, only path 222 or only a path through block 215 and filter 216 may be available between circuit 211 and output 217.

As described in the examples above, compensation circuit 211 comprises a plurality of delay elements each having the same fixed delay "T." In another embodiment, the delay units may not each have the same delay T. Instead, some or all of the delay units may have a delay period that is different from the delay period for one or more of the other delay elements.

In another embodiment, instead of using multiple delay units in compensation circuit 211, one or more of delay units may be used that have a variable delay period. The variable delay element may provide a normal or standard delay into the circuit path which may be, for example, equivalent to the delay of elements 213. Upon detecting a deviation in the number of fill samples in the received signal, detector and delay controller 220 may cause the variable delay element to add or reduce the circuit path delay as appropriate. Instead of sequentially adding or removing individual delay elements to the circuit path, the delay period for the variable delay element may then be adjusted in steps so that the circuit path delay is returned to the normal delay. The step size for adjustment of the variable delay element may be regular or irregular and may be selected to minimize any audible noise or distortion in the received signal.

Figure 3:
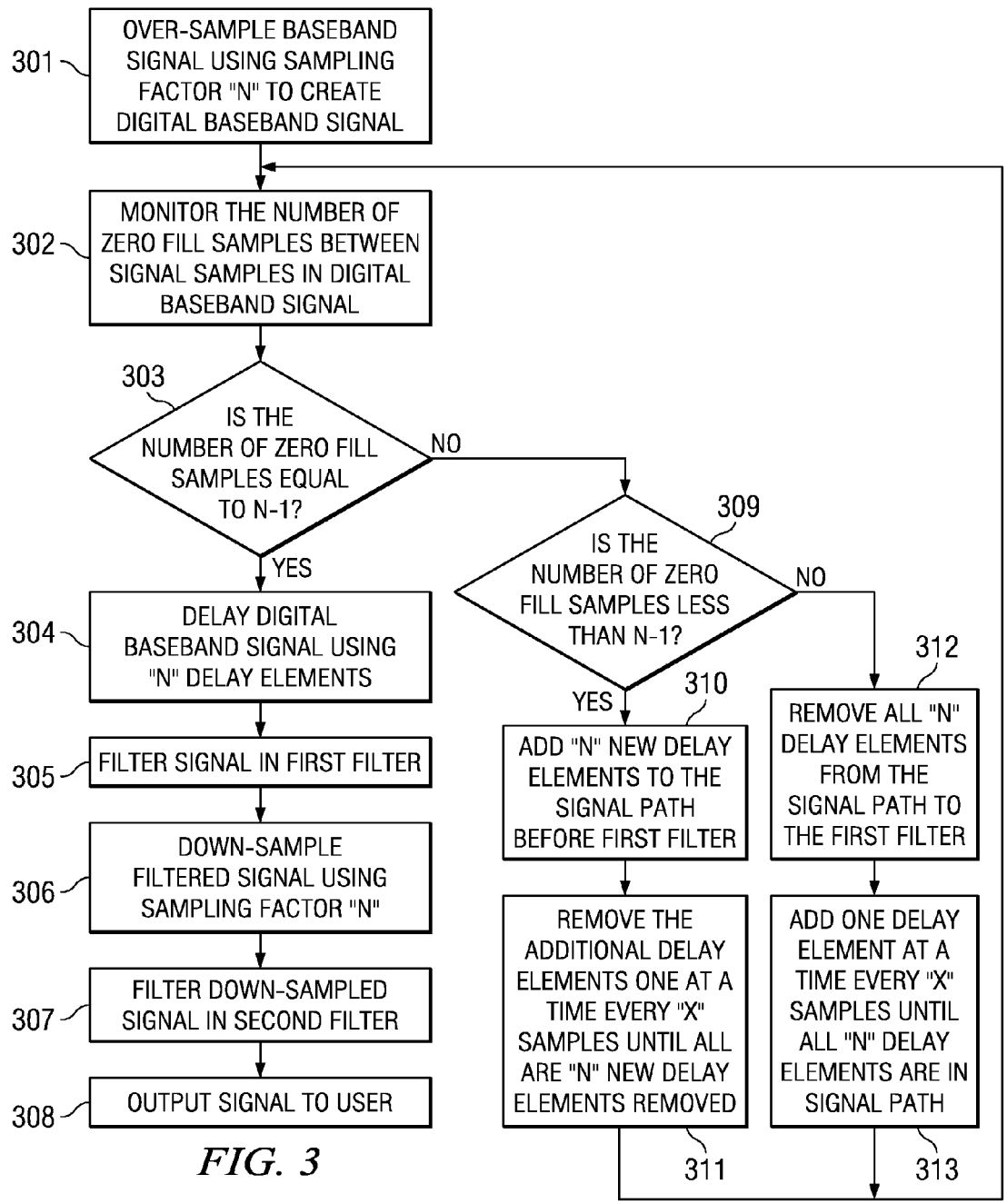
FIG. 3 is a flowchart illustrating an exemplary process for implementing an embodiment of the invention.

FIG. 3 is a flowchart illustrating an exemplary process for implementing one embodiment of the invention. In step 301, a baseband signal, such as signal output from baseband processor 209 (FIG. 2), is over-sampled using sampling factor N to create a digital baseband signal. In step 302, a detector, such as a processor or state machine, monitors the number of zero fill samples in between signal samples in the digital baseband signal. If the number of zero fill samples in step 303 are equal to N−1, then the process moves to step 304 wherein the signal is delayed using N delay elements, such as delay elements comprising D flip flops. In one embodiment, the number N may equal four, but other numbers of delay elements may also be used.

The delayed signal is then filtered in step 305 by a first filter, such as by a low pass filter having a normalized cut off frequency of 1/N. The output of the first filter is then down-sampled in step 306 using sampling factor N. The down-sampled signal is then filtered using a second filter in step 307, such as by a low pass filter having a normalized cut off frequency of 1/N. The output of the second filter is then played to the user, such as by broadcasting the signal through a speaker.

If, in step 303, the number of zero fill samples is not equal to N−1, then the process moves to step 309 to determine if the number of zero fill samples is less than N−1. If the number of zero fill samples is less than N−1, then N new delay elements are added to the signal path before the first filter. The signal path then includes the original N delay elements plus an additional N delay elements. Accordingly, when less than N−1 zero fill samples are detected, the signals initially pass through 2N delay elements before the first filter. The additional delay elements are removed one-by-one every "X" samples, in step 311, until all of the additional delay elements are removed from the signal path. The value of X may be ten, for example, so that every ten samples one of the delay elements is removed, but other intervals may also be used. The delay elements may be added or removed from the signal path by switching them into, or out of, the circuit. After the additional delay elements have been removed, the process returns to step 302 to monitor the number of zero fill samples in subsequent signals.

If, in step 309, the number of zero fill samples is not less than N−1, then the number of zero fill samples must be greater than N−1, because the number is also known to not equal N from step 303. If the number of zero fill samples is greater than N−1, then all N original delay elements mentioned in step 304 are removed from the signal path in step 312. The signal path would then lead from the over-sampling circuit to the first filter without a delay. The delay elements are then added one-by-one back into the signal path, such as by switching in individual delay elements one at a time every "X" number of samples until all of the original N delay elements are returned to the signal path. In one embodiment, the value of X may be ten, but other intervals may also be used. After the original delay elements have been returned, the process returns to step 302 to monitor the number of zero fill samples in subsequent signals.

One embodiment of the invention is directed to a method for processing signals comprising monitoring an over-sampled signal to detect missing fill samples, adding a plurality of delay elements to a signal path, if missing fill samples are detected, and individually removing the plurality of delay elements from the signal path at regular intervals until all of the delay elements are removed from the signal path. The number of delay elements may be selected based upon a sampling factor. The regular intervals may correspond to a number of samples. In one embodiment, four delay elements are added to the signal path, and one delay element is then removed from the signal path every ten samples. The delay elements may comprise D flip flops that are switched into the signal path. The over-sampled signal is delayed using the delay elements to create a delayed signal. The delayed signal may be filtered to create a first filtered signal. The first filtered signal may be down-sampled to create a down-sampled signal, and then filtered again. The filtering may be performed using a low-pass filter.

Another embodiment of the invention is directed to a method for processing signals comprising monitoring an over-sampled signal to detect extra fill samples, removing a plurality of delay elements from a signal path, if extra fill samples are detected, and individually returning the plurality of delay elements to the signal path at regular intervals until all of the delay elements are in the signal path. The total number of delay elements removed form the signal path may be based upon a sampling factor. The regular intervals may correspond to a number of samples. In an embodiment of the invention, four delay elements are removed from the signal path, and one delay element is then returned to the signal path every ten samples. The delay elements may comprise D flip flops that are switched into the signal path. The over-sampled signal is delayed using the delay elements to create a delayed signal. The delayed signal may be filtered to create a first filtered signal. The first filtered signal may be down-sampled to create a down-sampled signal, and then filtered again. The filtering may be performed using a low-pass filter.

A further embodiment of the invention is directed to a system for processing signals, comprising an over-sampling circuit for sampling received signals, a detector for detecting missing or extra fill samples in an output of the over-sampling circuit, an array of delay units coupled to the output of the over-sampling circuit, wherein the delay units are added to or removed from a signal path based upon detection of missing or extra fill samples, a first filter coupled to the output of the array of delay units, and a down-sampling circuit coupled to the output of the first filter. The system may further comprise a switch coupled to the array of delay units and operable to switch delay units into and out of the signal path, and a controller for controlling the operation of the switch. The detector and the controller may be the same or separate devices. The over-sampling circuit and the down-sampling circuit may use a sampling factor of four, and the total number of delay units available to be added to the signal path may be eight. The system may further comprise a second filter coupled to an output of the down-sampling circuit, and a speaker coupled to an output of the second filter. The switch may operate in a normal state in which a first group of N delay units are present in the signal path. The switch may operate in a missing sample state in which a second group of N delay units are added to the signal path and, after the second group of N delay elements are added to the signal path, they may be removed one at a time from the signal path at regular intervals. The switch may operate in an extra sample state in which the first group of N delay units are removed from the signal path and, after the first group of N delay elements are removed from the signal path, the delay elements are added one at a time to the signal path at regular intervals.

Although embodiments of the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for processing a signal, comprising:
monitoring an over-sampled signal to detect deviations in a number of fill samples;
providing an electronic delay adjustment to a signal path using an electronic delay device, if a deviation in the number of fill samples is detected; and
removing the electronic delay adjustment from the signal path in one or more steps until all of the electronic delay adjustment is removed from the signal path.

2. A method for processing a signal, comprising:
monitoring an over-sampled signal to detect deviations in a number of fill samples;
providing a delay adjustment to a signal path, if a deviation in the number of fill samples is detected, wherein providing the delay adjustment comprises adding one or more delay elements to the signal path or individually removing one or more delay elements from the signal path until all of the delay elements are removed from the signal path; and
removing the delay adjustment from the signal path in one or more steps until all of the delay adjustment is removed from the signal path.

3. The method of claim 2, wherein a number of delay elements is selected based upon a sampling factor.

4. The method of claim 2, wherein the one or more delay elements are removed at regular intervals correspond to a number of samples.

5. The method of claim 2, wherein the one or more delay elements are removed at irregular intervals.

6. The method of claim 2, wherein four delay elements are added to the signal path, and wherein one delay element is then removed from the signal path every ten samples.

7. The method of claim 2, wherein the one or more delay elements comprise D flip flops that are switched into the signal path.

8. The method of claim 2, further comprising:
delaying the over-sampled signal using the one or more delay elements to create a delayed signal;
filtering the delayed signal to create a first filtered signal;
down-sampling the first filtered signal to create a down-sampled signal; and
filtering the down-sampled signal.

9. The method of claim 8, wherein the filtering steps are performed using a respective low-pass filter.

10. A method for processing a signal, comprising:
monitoring an over-sampled signal to detect deviations in a number of fill samples;
providing a delay adjustment to a signal path, if a deviation in the number of fill samples is detected, wherein providing the delay adjustment comprises removing one or more delay elements from the signal path; and
removing the delay adjustment from the signal path in one or more steps until all of the delay adjustment is removed from the signal path, wherein removing the delay adjustment comprises individually returning the one or more delay elements to the signal path until all of the one or more delay elements are in the signal path.

11. The method of claim 10, wherein a number of delay elements is selected based upon a sampling factor.

12. The method of claim 10, wherein the one or more delay elements that are returned to the signal path at regular intervals correspond to a number of samples.

13. The method of claim 10, wherein the one or more delay elements are returned at irregular intervals.

14. The method of claim 10, wherein four delay elements are removed from the signal path, and wherein one delay element is then returned to the signal path every ten samples.

15. The method of claim 10, wherein the one or more delay elements comprise D flip flops that are switched into the signal path.

16. The method of claim 10, further comprising:
delaying the over-sampled signal using the one or more delay elements to create a delayed signal;
filtering the delayed signal to create a first filtered signal;
down-sampling the first filtered signal to create a down-sampled signal; and
filtering the down-sampled signal.

17. The method of claim 16, wherein the filtering steps are performed using a respective low-pass filter.

18. A system to process signals, comprising:
an over-sampling circuit to sample received signals;
a detector to detect deviations in a number fill samples in an output of the over-sampling circuit; and one or more delay units coupled to the output of the over-sampling circuit, wherein the one or more delay units are adapted to provide delay based upon detection of a deviation in the number of fill samples.

19. The system of claim 18, wherein the one or more delay units are configured to be added or removed from a signal path based upon detection of a deviation in the number of fill samples.

20. The system of claim 18, wherein the one or more delay units comprise an array of delay units.

21. The system of claim 20, further comprising:
a switch coupled to the array of delay units and operable to switch delay units into and out of a signal path; and
a controller to control the operation of the switch.

22. The system of claim 21, wherein the detector and the controller are implemented by a processor.

23. The system of claim 18, further comprising:
a first filter coupled to the output of the one or more delay units; and
a down-sampling circuit coupled to the output of the first filter.

24. The system of claim 23, wherein the over-sampling circuit and the down-sampling circuit use a sampling factor of four, and wherein a total number of delay units available to be added to a signal path is eight.

25. The system of claim 23, further comprising:
a second filter coupled to an output of the down-sampling circuit; and
a speaker coupled to an output of the second filter.

26. The system of claim 21, wherein the switch operates in a normal state in which a first group of N delay units are in the signal path and operates in a missing sample state in which a second group of N delay units are added to the signal path; and
wherein, after the second group of N delay units are added to the signal path, the second group of N delay units are removed one at a time from the signal path at regular intervals.

27. The system of claim 21, wherein the switch operates in a normal state in which a group of N delay units are in the signal path and operates in an extra sample state in which the group of N delay units are removed from the signal path; and
wherein, after the group of N delay units are removed from the signal path, the group of N delay units are added one at a time to the signal path at regular intervals.

* * * * *